United States Patent [19]

Solari et al.

[11] Patent Number: 5,272,350
[45] Date of Patent: Dec. 21, 1993

[54] ROTARY COUPLER EFFECTING POWER AND INFORMATION EXCHANGE

[75] Inventors: Mark Solari; Ron Brooks, both of Houston; John Brisco, Cypress, all of Tex.

[73] Assignee: Baker Hughes Incorporated, Houston, Tex.

[21] Appl. No.: 968,442

[22] Filed: Oct. 29, 1992

[51] Int. Cl.⁵ .................................... G02B 27/00
[52] U.S. Cl. .......................... 250/551; 359/143
[58] Field of Search .............. 250/551; 307/311; 340/870.28, 870.29; 359/143, 144, 159

[56] References Cited

U.S. PATENT DOCUMENTS

| | | |
|---|---|---|
| 4,310,767 | 1/1982 | Peacock . |
| 4,321,474 | 3/1982 | Tanaka et al. . |
| 4,495,648 | 1/1985 | Giger . |
| 4,613,990 | 9/1986 | Halpern . |
| 4,753,506 | 6/1988 | Einhorn et al. . |
| 4,837,556 | 6/1989 | Matsushita et al. . |
| 4,962,495 | 10/1990 | Gibbons et al. ............ 359/144 |
| 4,988,973 | 1/1991 | Inui et al. . |
| 5,019,814 | 5/1991 | Biggs et al. ............... 250/551 |

Primary Examiner—David C. Nelms
Assistant Examiner—K. Shami
Attorney, Agent, or Firm—Rosenblatt & Associates

[57] ABSTRACT

A rotary coupler comprises a rotary transformer which transfers power across an air gap and an infrared coupler that carries data across the air gap in duplex. The rotary transformer and the data coupler are built within an enclosure to withstand downhole conditions. Control circuitry comprising a pulse width modulator regulates the amount of power transferred across the air gap by the rotary transformer. The data coupler comprises two transmitter/receiver array pairs to transfer data across the air gap in duplex.

16 Claims, 5 Drawing Sheets

ROTARY COUPLER EFFECTING POWER AND INFORMATION EXCHANGE

FIELD OF THE INVENTION

The present invention relates generally to power and data communications systems between rotating and stationary elements and, more particularly, to a rotary coupler that couples power and full duplex communications between the surface and a location down-hole in a drilling apparatus.

BACKGROUND OF THE INVENTION

Rotary tools, such as boring and drilling tools, are commonly used to cut, remove, and shape material, such as metal, earth, and rock. Such tools commonly encounter and generate heat, vibration, various stresses, and other conditions that may effect the performance and safety of the cutting tool. These conditions are often monitored so that tool operators remain aware of the status of the tool. Also, tools themselves may have instruments mounted in them which may required input data for calibration or to vary the parameters to be monitored. Further, sensors and instruments on the tool may require electrical power for operation. Thus, there remains a need for a coupler that can relay data in full duplex between the stationary and rotary portions of the tool and can provide power to powered instruments on the rotating tool.

Matsushita et al., U.S. Pat. No. 4,837,556, disclose a system for transmitting power and data signals using an electromagnetic wave or light. The system is adapted to transmit power and information between stationary and moving portions of machines, such as spindles of numerically controlled machine tools. Data and/or power is transferred between an active module A to a passive module B. In the active module, data in parallel form is converted to serial form in a parallel to serial converter (P/S converter), frequency shift modulated, and amplified for transmission. This signal is then transmitted as an electromagnetic wave. Module A receives an optical signal from module B, converts this signal to an electrical signal, amplifies the electrical signal, and demodulates the signal to obtain serial data, then converts the serial data to parallel form in a serial to parallel converter (S/P converter) for further processing. The P/S converter and the S/P converter are controlled by a control timing signal $CS_1$ generated by a controller comprising a microcomputer with reference to a suitable transmit/receive switch signal $SR_1$. The passive module B receives the electromagnetic transmission from module A in a receiving head 13. A portion of the energy received is converted into a power supply voltage $E_1$ in a rectifier and smoothing circuit 14. Another portion of the energy received is used to develop a baud rate clock signal by a frequency divider 15. The remainder of the energy received is demodulated by a detector 10 to provide serial data. As with the active module A, control of a S/P converter 11 for incoming data and a P/S converter 1' is provided by a controller 12' in response to an external control signal $SR_2$. Thus, neither the active module A nor the passive module B is capable of duplex data transfer.

Peacock, U.S. Pat. No. 4,310,767, discloses a data interface for data transmission between rotating and stationary members. This system is specifically adapted for data transmission between an axle and a frame of a railroad car. A plurality of sensors detect stress which provide the strain gage transducer portion of a balanced bridge of a transducer circuit. Duplex data transmission is not possible in this configuration. A mode control actives a transmitter to activate a signal from the frame to the axle. The signal received at the axle serves to deactivate the bridge circuit using a relay or to enable logic circuitry in an amplifier to calibrate the transducers.

While Peacock shows a battery as the power source for the elements on the axle, he mentions that power could be provided by transmission between the frame and axle as by an air core transformer. Peacock provides no structure as to how this is to be accomplished.

Tanaka et al., U.S. Pat. No. 4,321,474, disclose another optical signal transmission system for communication between a rotating body and a stationary body. Tanaka et al. teach that multiple transmitting optical elements or multiple receiving optical elements can be used. This reference also teaches a parallel optical communication scheme (8 bits in the illustrated embodiment). Tanaka et al. show that information can be transmitted from the stationary body to the rotating body but does not suggest how this system can be adapted to accomplish simultaneous communication in both directions. Further, no power transmission between rotating and stationary bodies is suggested by Tanaka et al.

Einhorn et al., U.S. Pat. No. 4,753,506, teach no more than is shown in previously discussed references. Einhorn et al. disclose a transmitter and a plurality of beam splitters. This scheme creates a detection path so that a detector is always in communication with at least one transmission path from one of the beam splitters. Einhorn et al. provide no duplex communication or power transmission.

Thus there remains a need for a system which provides full duplex communication between rotary and stationary members along with means for coupling electrical power to the rotary member.

SUMMARY OF THE INVENTION

The present invention provides such a system by furnishing a power transformer across an air gap between the stationary and rotary members of a tool and data communications channels, independent of one another, between the stationary and rotary members of tool. The rotary transformer comprises a primary coil in the stationary member and a secondary coil on a rotating shaft. Electrical power is coupled between the primary and secondary coils across an air gap between. The power transmission system also includes a transmitter/receiver feedback circuit to properly control the amount of power coupled to the secondary.

The present invention also includes a dual channel data transmission system. The data transmission system includes a first set of infrared transmitters and receivers to communicate data from the stationary member to the rotary member and a second set of infrared transmitters and receivers to couple data in the other direction. The transmitters and receivers are spaced around the periphery of an enclosure to ensure proper illumination at all times. The power transformer, the data communications channels, and all of the associated electronics are sealed within an enclosure to protect against an adverse environment.

The present invention is specially adapted as part of a drill string of an oil and gas well drilling tool but equally applicable to other tools with stationary and rotary members, such as machine tools and the like.

These and other objects and features of the present invention will be readily apparent of those of skill in the art when reviewing the following detailed description.

DETAILED DESCRIPTION OF A PREFERRED EMBODIMENT

Figure 1:
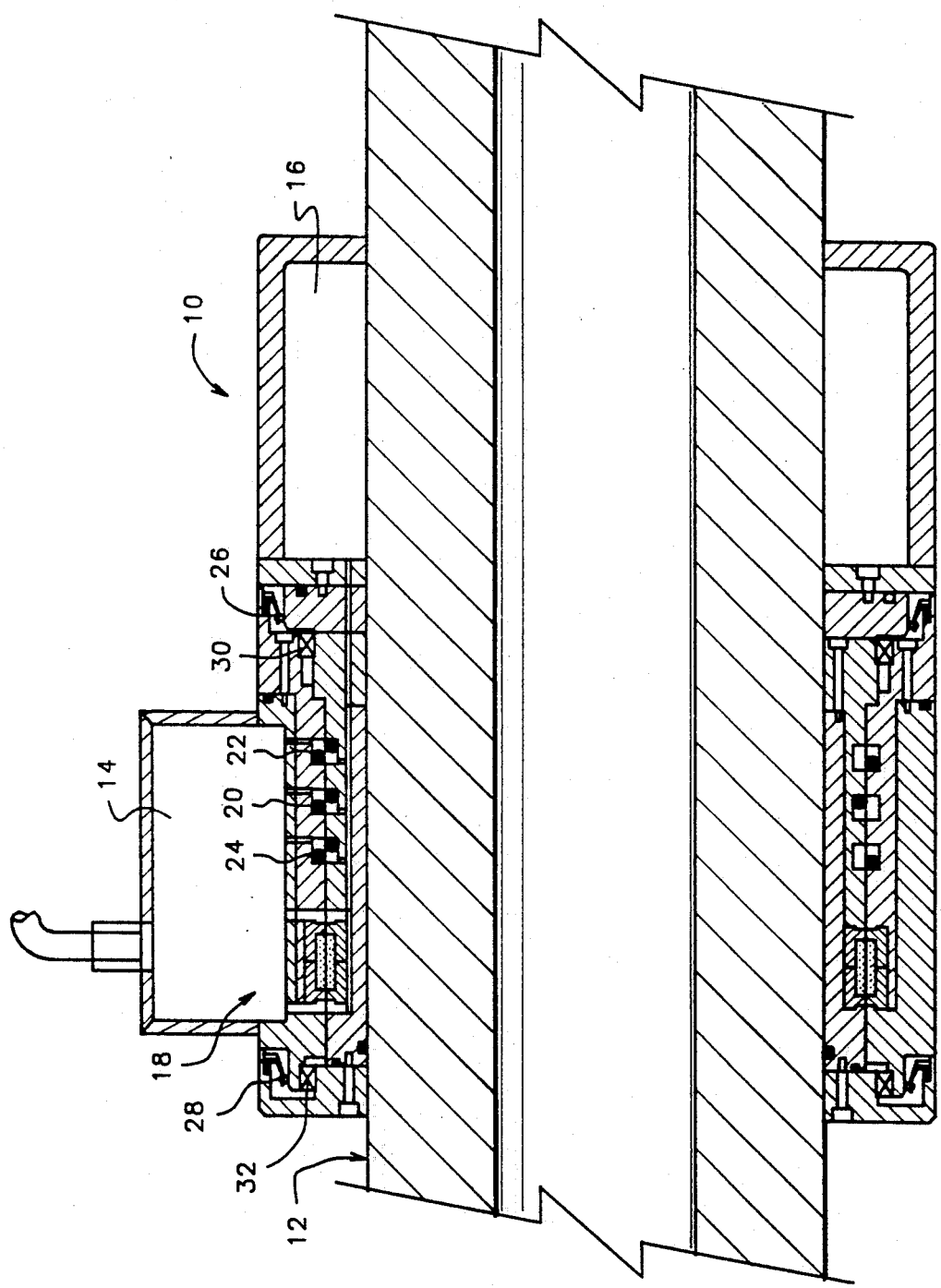
FIG. 1 is a section view of the power and data transmission system in a rotary coupler of the present invention.

FIG. 1 depicts a rotary coupler 10 of the present invention. The rotary coupler 10 comprises a main rotating shaft 12, a stationary electronics portion and enclosure 14, and a rotating electronics portion and enclosure 16. The stationary electronics include a pulse modulation input circuit and infrared (I/R) transmitter and receiver circuits. The rotating electronics include a voltage sensing circuit, feedback and I/R circuits and data acquisition circuits.

The operational portions of the present invention include a rotary transformer 18 along with associated control circuitry which transfers power across an air gap and a set of I/R couplers 20 and 22 which allow high speed data to be transmitted across the air gap in two directions simultaneously. The rotary transformer 18 and the I/R couplers 20 and 22 are integrated together by design within the same enclosure.

The rotary transformer 18 consists of a magnetic ferrite core, or other suitable material, having two parts. The primary core may be referred to as the stationary core and the secondary core may be referred to as the rotating core. Both cores are mounted on the same axis of rotation and there is an air gap between cores. The rotary transformer 18 is shown in greater detail in FIG. 2.

Figure 3:
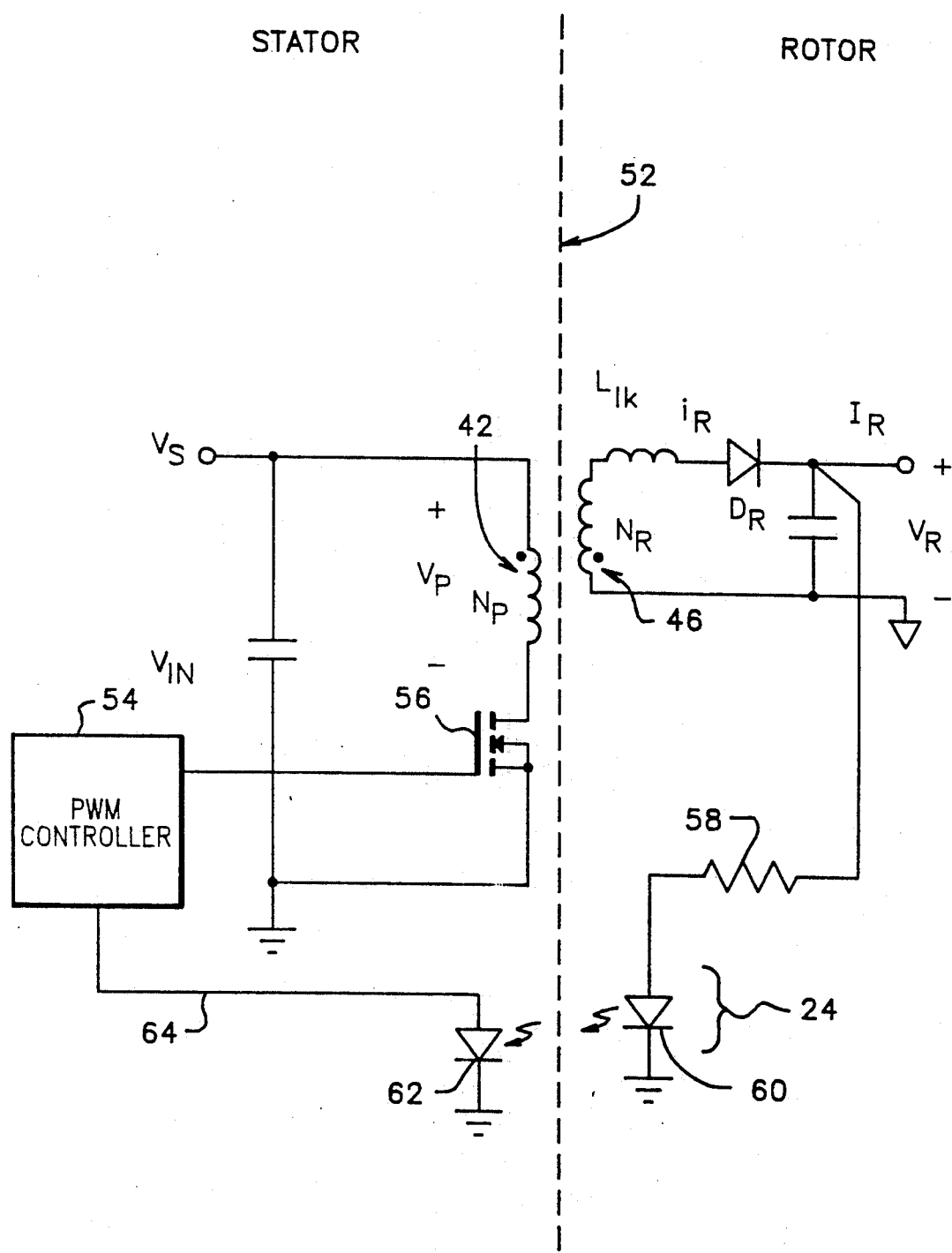
FIG. 3 is an electrical schematic of a power control circuit for the rotary transformer.

The rotary coupler 10 also includes a feedback loop I/R coupler 24, described in greater detail with regard to FIG. 3.

The preferred rotary coupler 10 provides an enclosure for the transformer and the electronics. Rotary seals 26 and 28 seal the enclosure to provide containment against moisture and other conditions that could adversely effect electrically powered components within the coupler. A set of bearings 30 and 32 provide the load bearing between the rotating and stationary portions of the coupler. Also, a cable 34 electrically connects the coupler to a control unit (not shown) to conduct power and data communication. The data communication portion of the cable 34 is a fiber-optic cable or a wire conductor, depending of the desired data rate.

Figure 2:
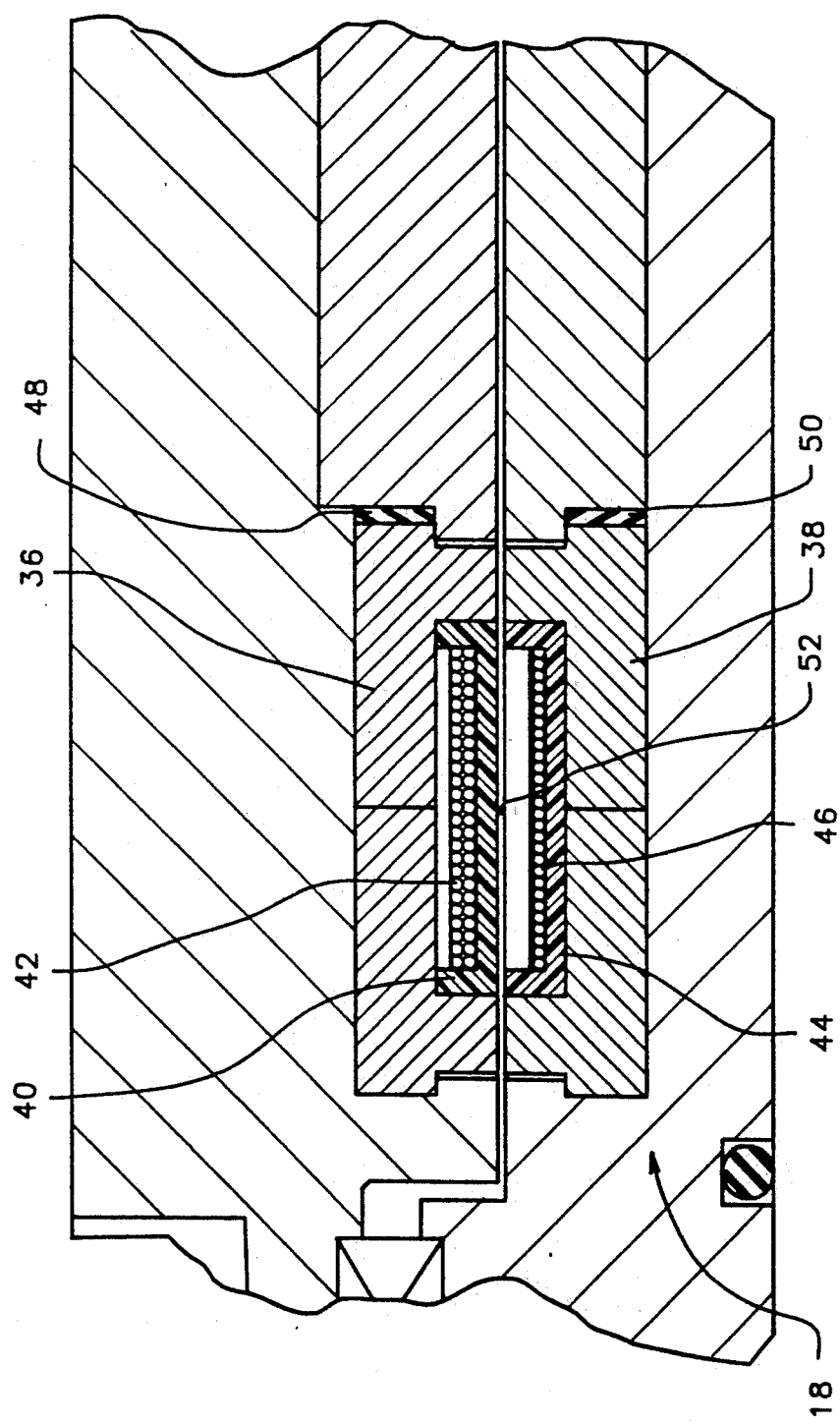
FIG. 2 is a more detailed section view of a rotary transformer.

FIG. 2 provides greater detail of the rotary transformer 18. The rotary transformer 18 includes a stationary core 36 and a rotating core 38. Within each core, stationary and rotating, is placed a bobbin, a fiberglass form, upon which copper wire or copper foil is wound onto to form a coil. A stationary bobbin 40 holds the primary windings 42 and a rotating bobbin 44 holds the secondary windings 46. A set of compressed rubber gaskets 48 and 50 hold the bobbins and their associated windings firmly in place and simplify manufacture and assembly of the coupler.

In operation, electrical current of a fluctuating nature (alternating current) is forced through the primary coil creating a fluctuating magnetic field in the stationary core, which in turn creates a fluctuating magnetic field in the rotating core. The fluctuating magnetic field within the rotating core forces a current to flow in the secondary coil, thereby transferring power across an air gap 52 between stationary and rotating cores. FIG. 3 depicts a preferred embodiment of developing this fluctuating electrical current.

A pulse width modulator (PWM) controller 54 forces an electrical switch (such as a transistor) 56 to turn on and off at a specific yet variable rate. The electrical switch alternately connects and disconnects one end of the primary coil 42 to electrical ground, thereby producing a fluctuating current flowing from a constant voltage source $V_s$ through the primary coil to ground. The pulse width modulator controller 54, by turning the electrical switch on and off, regulates the amount of power transferred across the gap 52, i.e., the longer the pulse width (the duration that the electrical switch 56 remains connected to electrical ground), the greater the power transferred to the secondary coil 46.

Once a voltage is generated between the two ends of the secondary coil 46, this voltage is monitored via a feedback loop 24 and the turn on and off of the electrical switch is varied to regulate fluctuations in power required by the rotating electronics. In the present invention, the feedback loop comprises a voltage sensing resistor 58, an I/R transmitter 60, an I/R receiver 62, and input circuitry 64 to the pulse width modulator 54.

The feed back loop circuitry located in the rotating enclosure 16 senses the secondary voltage which in turn modulates the intensity of an array of three infrared light emitting diodes, IRLED's, in the feedback loop I/R coupler 24 (FIG. 1). The infrared light illuminates across the gap, an array of infrared receivers which are mounted equally spaced around the circumference of the stationary enclosure, as shown in FIG. 4. The array of receivers assures that one receiver will be illuminated at all times during rotation. The number of infrared receivers and their orientation will depend on the diameter of the application.

Figure 4A:
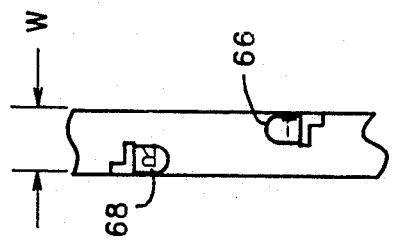
FIGS. 4 and 4a are a section view of a first data transmission channel.
Figure 4:
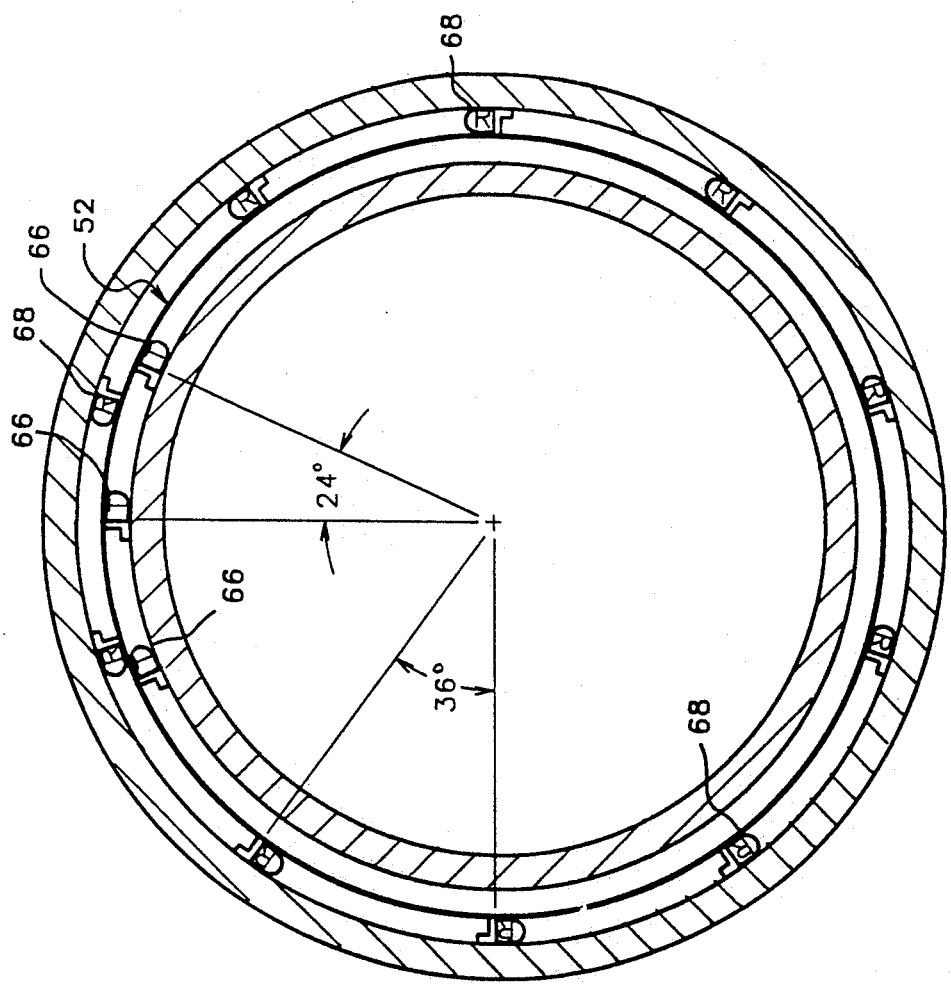
Figure 5A:
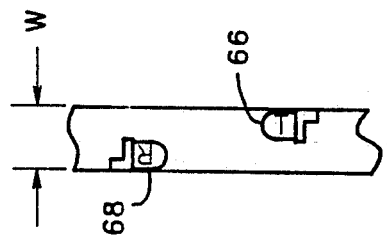
FIGS. 5 and 5a are a section view of a second data transmission channel, providing full duplex data communication.
Figure 5:
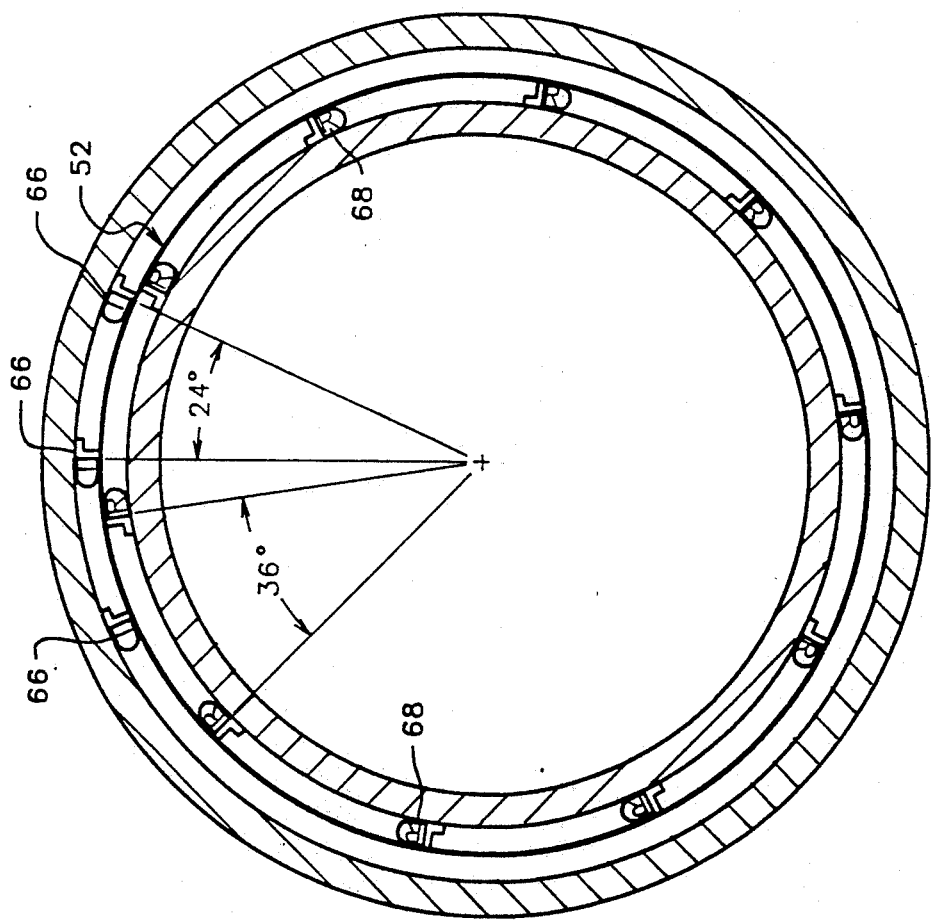

As shown in FIGS. 4 and 5, the infrared coupler comprises two infrared transmitter/receiver array pairs so arranged to allow high speed data to be transferred from the stationary enclosure, across the gap to the rotary enclosure, and back across the gap. The transmitter/receiver arrays allow for simultaneous data transmission, i.e. full duplex.

FIG. 5 depicts the "uplink" I/R channel, i.e., the data link from the stationary member to the rotating member. On the stationary member, infrared transmitter LED's 66 are mounted in an array to insure illumination at all times. The transmitter LED's 66 are mounted in an array to insure illumination at all times. The transmitter LED's 66 are electrically connected in series, each one producing the same quantity of illumination. On the rotary enclosure, infrared receivers 68 are mounted equally spaced around the circumference. The array of receivers are all electrically connected in parallel assuring that one receiver will be illuminated at all times during rotation. The two transmitter/receiver arrays of FIG. 5 allow data to pass from the stationary electronics to the rotating electronics, i.e. one half of the duplex communication link.

Likewise, for data to pass from the rotating electronics to the stationary electronics, there exists a second data path, shown in FIG. 4. On the rotary enclosure, three infrared transmitter LED's 66 are mounted in an array to insure illumination at all positions of rotation. They are electrically connected in series, each producing the same quantity of illumination. On the stationary enclosure, ten receivers 68 are mounted equally spaced around the circumference. Once again, the receivers of this array are electrically connected in parallel to assure that one receiver will be illuminated at all times during rotation. This second transmitter/receiver array forms a second data path to complete the two-way communication link.

In operation, the infrared transmitters within each path are electrically turned on and off modulating the intensity of illumination; "on" represents a logical "1" while "off" represents a logical "0". These conditions are detected by the receiver which translates them to a representative electrical output in the form of data.

FIGS. 4a and 5a depict the arrangement of the transmitter LED's 66 and the receivers 68, within the enclosure. In a preferred embodiment, the dimension W is approximately one half of an inch. This dimension may be varied, depending on the application, so long as the LED's remain clear of each other and the receivers are properly illuminated.

The preceding description is intended as illustrative only and not as limiting the present invention. Those of skill in the art will quickly devise modifications fully within the scope and spirit of the invention.

We claim:
1. A rotary power and data coupler comprising:
   a. a stationary member with an axis;
   b. a rotary member within and coaxial with the stationary member;
   c. a primary transformer winding mounted to the stationary member;
   d. a secondary transformer winding mounted to the rotary member and aligned with the primary transformer winding;
   e. a plurality of first data transmission elements mounted to the stationary member;
   f. a plurality of first data receiver elements mounted to the rotary member and aligned with the first data transmission elements;
   g. a plurality of second data transmission elements mounted to the rotary member; and
   h. a plurality of second data receiver elements mounted to the stationary member and aligned with the second data transmission elements.

2. The coupler of claim 1 wherein the data transmission elements are light emitting diodes.

3. The coupler of claim 2 wherein the light emitting diodes emit infrared light.

4. The coupler of claim 1 further comprising a primary bobbin in the stationary member to hold the primary winding.

5. The coupler of claim 1 further comprising a secondary bobbin in the rotary member to hold the secondary winding.

6. The coupler of claim 4 further comprising a primary core between the primary bobbin and the stationary member.

7. The coupler of claim 5 further comprising a secondary core between the secondary bobbin and the rotary member.

8. The coupler of claim 1 wherein the rotary member comprises a drill string of a drilling tool.

9. The coupler of claim 1 wherein the rotary member comprises a shaft of a machine tool.

10. The coupler of claim 1 wherein the first data transmission elements comprise three light emitting diodes spaced to insure illumination on an interior surface of the stationary member.

11. The coupler of claim 1 wherein the second data transmission elements comprise light emitting diodes spaced to insure illumination on an exterior surface of the rotary member.

12. The coupler of claim 1 wherein the first data receiver elements comprise a plurality of light emitting diodes that insure reception spaced equidistant apart on an exterior surface of the rotary member.

13. The coupler of claim 1 wherein the second data receiver elements comprise a plurality of light emitting diodes that insure reception spaced equidistant apart on an interior surface of the stationary member.

14. The coupler of claim 1 further comprising a controller to control the voltage on the secondary winding comprising:
   a. an electrical switch coupled in series with the primary winding;
   b. a pulse width modulator coupled to the electrical switch to variably control current through the primary winding;
   c. a sensor to sense the voltage across the secondary winding; and
   d. a feedback circuit to provide an indication of the voltage across the secondary winding to the pulse width modulator.

15. The coupler of claim 14 wherein the feed back circuit comprises a plurality of light emitting transmitters on the rotary member and a plurality of light receivers on the stationary member.

16. A method of coupling power and data between stationary and rotary members of a tool comprising the steps of:
   a. coupling electrical power between a primary coil on the stationary member and a secondary coil on the rotary member; and
   b. transmitting data in full duplex from data transmitters on the stationary member to data receivers on the rotary member and from data transmitters on the rotary member to data receivers on the stationary member.

* * * * *